(12) United States Patent
Chen et al.

(10) Patent No.: US 6,697,108 B1
(45) Date of Patent: Feb. 24, 2004

(54) FAST FRAME READOUT ARCHITECTURE FOR ARRAY SENSORS WITH INTEGRATED CORRELATED DOUBLE SAMPLING SYSTEM

(75) Inventors: Zhiliang Julian Chen, Plano, TX (US); Eugene G. Dierschke, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/223,166

(22) Filed: Dec. 30, 1998

Related U.S. Application Data
(60) Provisional application No. 60/070,083, filed on Dec. 31, 1997.

(51) Int. Cl.[7] ............................................... H04N 5/217
(52) U.S. Cl. ...................................... 348/241; 348/308
(58) Field of Search ................................. 348/241, 243, 348/308

(56) References Cited

U.S. PATENT DOCUMENTS

| | | |
|---|---|---|
| 4,387,402 A | 6/1983 | Lewis |
| 4,407,010 A | 9/1983 | Baji et al. |
| 4,445,117 A | 4/1984 | Gaalema et al. |
| 5,449,908 A | 9/1995 | Wadsworth et al. |
| 5,471,515 A | 11/1995 | Fossum et al. |
| 5,698,852 A * | 12/1997 | Tanaka et al. ............... 348/308 |
| 5,812,191 A * | 9/1998 | Orava et al. ................. 348/308 |
| 5,900,623 A * | 5/1999 | Tsang et al. ................. 348/308 |
| 5,949,483 A * | 9/1999 | Fossum et al. ............. 348/310 |
| 6,320,616 B1 * | 11/2001 | Sauer ......................... 348/241 |

FOREIGN PATENT DOCUMENTS
WO     WO 98/54890     12/1998

OTHER PUBLICATIONS
Mangelsdorf et al., "A CMOS Front-End for CCD Cameras," Session 11/Electronic Imaging Circuits/Paper FA 11.5, p. 186, pp. 189–191.
Blanksby et al., "Noise Performance of a Color CMOS Photogate Image Sensor," IDEM '97, pp. 205–208.

* cited by examiner

Primary Examiner—Wendy R. Garber
Assistant Examiner—Jason Whipkey
(74) Attorney, Agent, or Firm—J. Dennis Moore; W. James Brady, III; Frederick J. Telecky, Jr.

(57) ABSTRACT

A MOS architecture for reading rows of pixels in an area array imager. After initial setup, individual pixels are read one row at a time using one clock pulse per pixel.

7 Claims, 5 Drawing Sheets

FAST FRAME READOUT ARCHITECTURE FOR ARRAY SENSORS WITH INTEGRATED CORRELATED DOUBLE SAMPLING SYSTEM

This application claims priority under 35 USC § 119(e)(1) of provisional application Nos. 60/070,083 filed Dec. 31, 1997.

The present application has some Figures in common with, but is not necessarily otherwise related to, the following application(s), which have common ownership and common effective filing dates with the present application: "Mismatch Independent Reset Sensing for CMOS Area Array Sensors" Ser. No. 60/070,223 filed Dec. 31, 1997; and "Sequential Correlated Double Sampling Technique for CMOS Area Array Sensors" Ser. No. 60/070,082 filed Dec. 31, 1997, now U.S. Pat. No. 6,248,991; both of which are herein incorporated by reference.

BACKGROUND AND SUMMARY OF THE INVENTION

This application is related to CMOS imaging sensors.

Background: CMOS Imagers

For the past 20 years or so, the field of optical sensing has been dominated by the charged couple device ("CCD"). However, CCD sensors have a number of problems associated with their manufacture and use. CCD imagers require a special manufacturing process which is incompatible with standard CMOS processing. Thus CCD imagers cannot be integrated with other chips that provide necessary support functions, but require independent support chips to perform, for example, CCD control, A/D conversion, and signal processing. The operation of a CCD imager also requires multiple high voltage supplies varying from, e.g. 5V to 12V. The higher voltages produce higher power consumption for CCD devices. Consequently, costs for both the CCD image sensor and ultimately the system employing the sensor, remain high.

The recent advances in CMOS technology have opened the possibility of imagers offering significant improvements in functionality, power, and cost of, for example, digital video and still cameras. Advances in chip manufacturing processes and reductions in supply voltages have encouraged revisitation of CMOS technology for use in image sensors. The advent of sub-micron CMOS technology allows pixels which contain several FETs, and are circuits in their own right, to be comparable in size to those existing on commercial CCD imagers. Fabrication on standard CMOS process lines permits these imagers to be fully integrated with digital circuitry to create single-chip camera systems. A CMOS area array sensor (or CMOS imager) can be fabricated with other system functions, e.g. controller, A/D, signal processor, and DSP. Hence, the cost of the CMOS process is more economical than that of the CCD process. CMOS imagers can operate with a single low supply voltage (e.g. 3.3V or 5V). This provides lower power consumption than CCD imagers.

In CMOS area array sensors, each column (or row) has separate read circuitry. Driver mismatches between different columns produce column FPN. Much of the device mismatches are caused by the threshold voltage deviations between. CMOS transistors across the wafer.

Techniques such as Correlated Double Sampling ("CDS"), and Sequential Correlated Double Sampling ("SCDS") can be used to suppress fixed pattern noise in CMOS imagers. In general, in a CDS architecture, a pixel sensing NMOS transistor performs double samplings. First the photo diode ("PD") voltage signal is sensed, then a known, fixed voltage (for example, Vdd) is sensed. Subtraction is then performed to suppress the mismatch effect caused by pixel sensing NMOS transistor variations in a wafer.

For an on-chip integrated CDS system sensor array, the fixed pattern noise would be greatly reduced. But due to the additional sampling steps required for CDS, the sensor array requires additional clock signals for one pixel readout, and thus increases the length of time for readout of a whole array (or a frame) for a given clock speed. This results in a low frame rate and limits the capabilities of the sensor in live video application to approximately 30 frames per second.

Background: Fixed Pattern Noise

Figure 3:
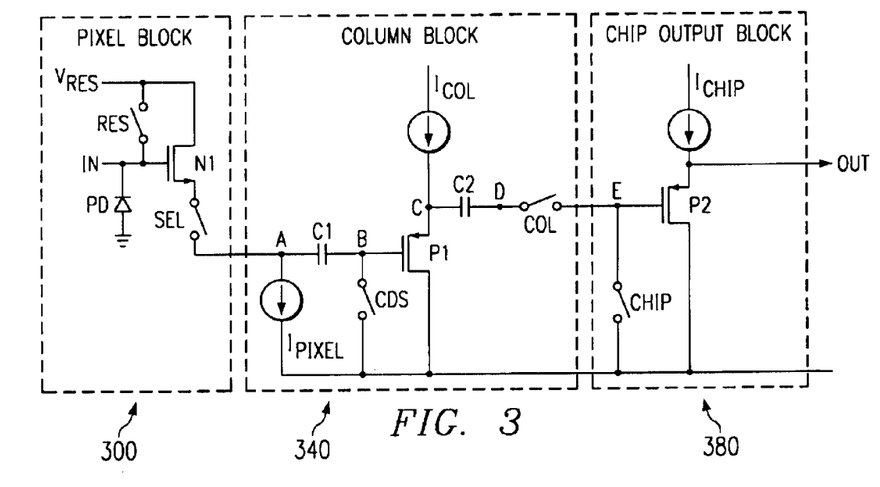
FIG. 3 shows a circuit diagram of a Sequential CDS pixel readout architecture.

One significant disadvantage with CMOS imagers has previously limited their widespread application—Fixed Pattern Noise ("FPN"). FPN is a built-in characteristic of X-Y addressable devices and is particularly an issue with any sort of CMOS imaging chips. FPN is noise that appears in a fixed pattern because the noise level is related to the position of the pixel in the array, the geometry of the column bus, and the proximity of other noise sources. (In addition, there is purely random noise not correlated to the pixel position, but due to inherent characteristics of the detector.) The effect of FPN is like viewing a scene through a window made of photo negatives. FPN occurs when process limitations produce device mismatches and/or non-uniformities of the sensor during fabrication on a wafer. FPN consists of both pixel FPN and column FPN. Each pixel circuit comprises at least a photodiode and a sensing transistor (operating as source-follower) as shown in FIG. 3. Mismatches of the sensing transistor between pixels may produce different output levels for a given input optical signal. The variations of these output levels is called pixel FPN. Additionally, each column (or row) has separate read circuitry. Driver mismatches between different columns (or rows) produce column FPN. Most device mismatches are caused by threshold voltage ($V_T$) mismatches among CMOS transistors across the wafer.

A conventional solution for FPN suppression is to use a memory block to store the signal data for a whole frame and to subtract the FPN by sampling a reset voltage for the whole frame. The subtraction is done on a frame-by-frame basis which results in very slow frame rates.

Background: Correlated Double Sampling

Correlated double sampling plays an important role in removing several kinds of noise in high-performance imaging systems. Basically, two samples of the sensor output are taken. First, a reference sample is taken that includes background noise and noise derived from a device mismatch. A second sample is taken of the background noise, device mismatch, and the data signal. Subtracting the two samples removes any noise which is common (or correlated) to both, leaving only the data signal. CDS is discussed in greater detail in a paper by Chris Mangelsdorf, Analog Devices, Inc., 1996 IEEE International Solid-State Circuits Conference, which is hereby incorporated by reference.

Fast Frame Readout Architecture Using an Integrated CDS System

The present application discloses a high-speed pixel readout technique in a CMOS imager while minimizing low fixed pattern noise. The technique described in this patent disclosure can realize a fast frame readout rate for a sensor array with an on-chip integrated SCDS technique. The technique, together with a SCDS technique, enables one to achieve the CDS operation for a whole row of pixels simulta-neously. Pixels are then readout at the rate of one pixel per clock-cycle. Where prior-art systems utilize row and column decoders, or perhaps row and column shift registers for digital control readout, the disclosed innovative technique implements a one-hot-coded flip-flop architecture to simplify the digital control readout.

An advantage of the disclosed innovative technique and structure is that fewer clock cycles are required to read out the pixels. After an initial read-preparation phase of no more than four clock cycles, each pixel of a row requires only one additional clock cycle to be readout. Another advantage is that there is a significant savings in chip real estate associated with the high-speed readout advantages afforded with the innovative technique and structures. Another advantage of the disclosed innovative technique and structures is that faster frame rates are possible.

BRIEF DESCRIPTION OF THE DRAWINGS

The disclosed inventions will be described with reference to the accompanying drawings, which show important sample embodiments of the invention, wherein.

DETAILED DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

The detailed description will begin with a brief discussion of a prior art pixel, array sensor, and correlated doubled sampling method. Next, the innovative fast readout architecture is discussed in detail. Next, a fast readout sensor chip, and a camera system incorporating the chip are discussed. Finally, various sections of the row/column select circuits, and control circuit, of the fast readout circuit are discussed in general.

Conventional Pixel Arrays

Two different types of sensors can be realized in CMOS technology. These are passive and active pixel sensors. The difference between these two types is that a passive pixel does not perform signal amplification whereas an active pixel does. A passive-pixel sensor is simply a photodiode (MOS or p-n junction diode) with a transistor that passes photoelectrically generated signal charge to an amplifier outside of the pixel array (a sensing transistor, e.g. N1 is not present in a passive pixel circuit).

Figures 5, 6:
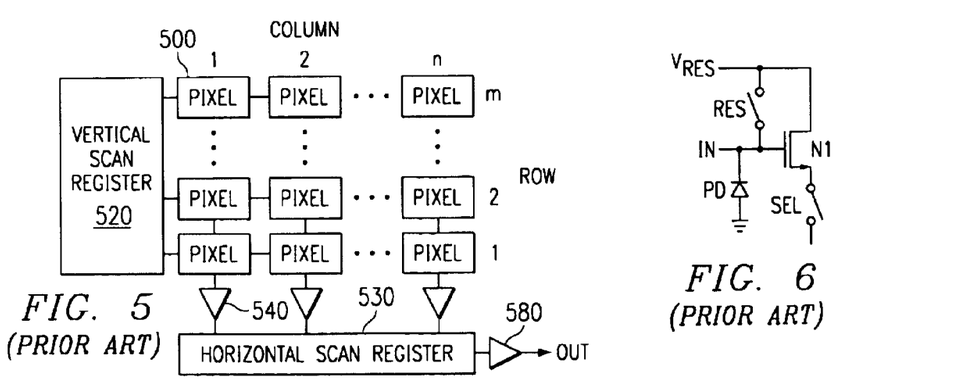
FIG. 5 shows a typical CMOS area array of m pixels x n columns.
FIG. 6 shows a typical single active pixel circuit.

FIG. 6 shows a typical active-pixel sensor circuit. The gate of transistor N1 is connected to a reset switch RES and the cathode of a photodiode PD. Initially, the reset switch RES is closed and the voltage at node IN approximates the reset voltage $V_{RES}$. A finite charge exists at node IN which is dependent on the voltage $V_{RES}$, and the capacitances of both the photodiode PD and gate of the NMOS transistor N1. When switch RES is opened, the photodiode current causes the charge at node IN to be discharged, and the voltage at node IN decreases. After a fixed integration time, the voltage at node IN drops to $V_{PD}$, the voltage of the photodiode. Switch SEL (in conjunction with NMOS transistor N1) is used to read the voltage at node IN.

FIG. 5 shows a typical array of pixel circuits with readout support circuitry. In this CMOS imager, each pixel block comprises a photosensitive diode or other junction device which converts photons into charge. Pixel block 500 represents a single pixel block in an array of pixel blocks (n columns×m rows). Column amplifier block 540 is one of many column amplifiers and/or drivers that provide the interface from a respective column of individual pixel blocks 500 to the chip output buffer/amplifiers block 580. Horizontal and vertical scan registers (530 and 520) transfer the pixel signals onto the readout lines. The signal is amplified for use by later circuitry.

Fast Frame Readout Architecture Using an Integrated CDS System

Figure 1:
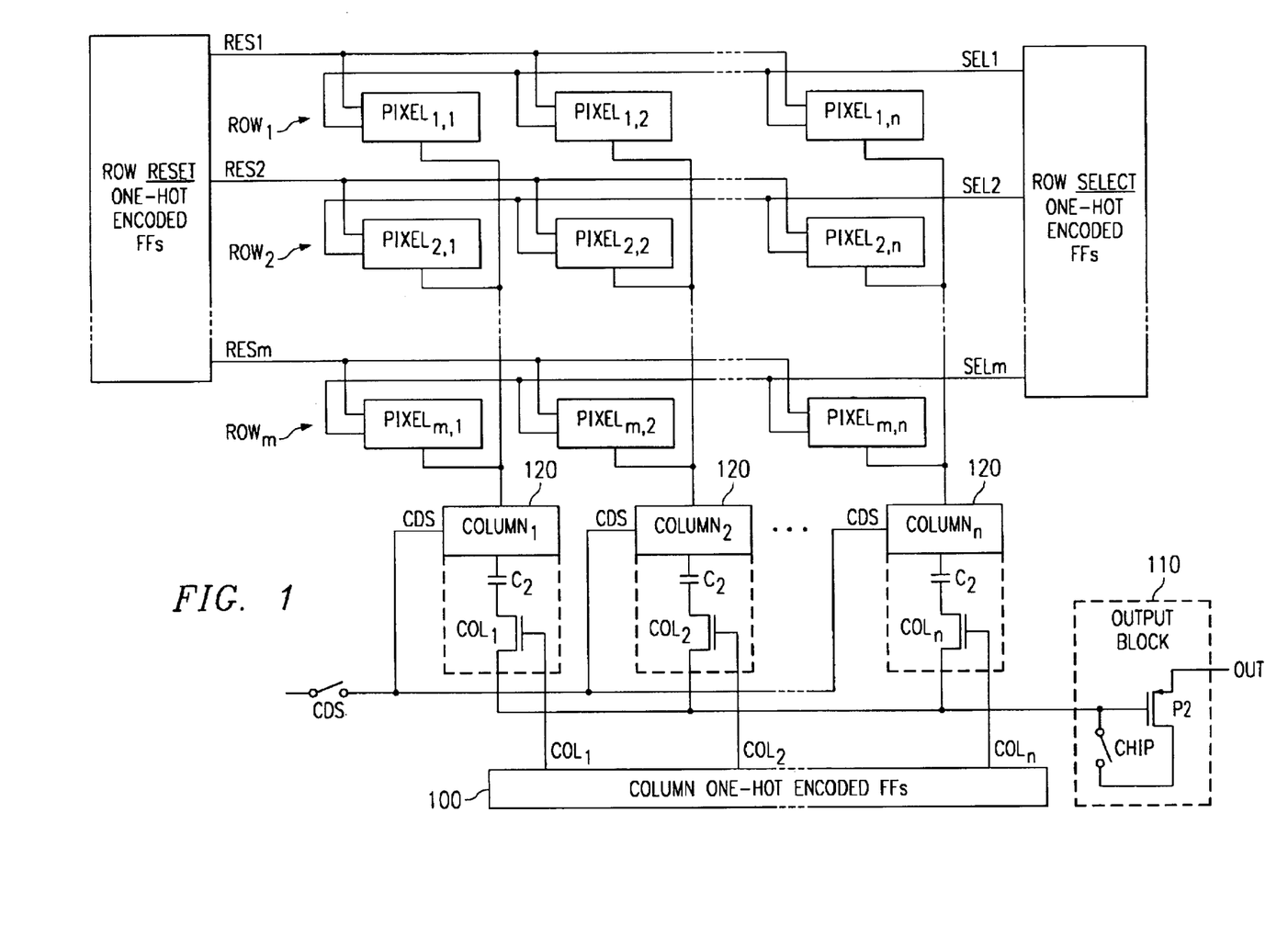
FIG. 1 shows a preferred embodiment of the innovative one-hot-encoded readout architecture.

FIG. 1 shows a preferred embodiment of the innovative one-hot-encoded readout architecture applied to an area array. The readout operation of the pixel array is performed in a significantly smaller number of clock cycles than provided by conventional architectures.

After an integration period (0.1–30 ms may be an approximate range of integration times), pixel readout is performed for a specific row, for example $Row_1$. The remaining rows ($Row_2$ through $Row_m$) of the m row×n column pixel array are in an integration period and nearing the time to be read (select switches $SEL_2$ through $SEL_m$ are open). However, before all pixels of a given row are read, all column switches $COL_1$–$COL_n$ are closed along with switches CHIP and CDS, to initialize all column readout circuits 120, and prepare for the correlated double sampling process.

Step 2 begins by closing switch $SEL_1$ (linked to all $Row_1$ pixels), and opening all column switches $COL_1$–$COL_n$ (linked to individual columns of pixels). Closing switch $SEL_1$ couples the photodiode voltages (developed in the first row of pixels $Row_1$) to each of the respective column readout circuits 120.

In Step 3, switches CDS and CHIP are opened. The column readout circuits 120 are now ready to read the reference voltage from the first row of pixels $Row_1$. After reading the reference voltage, the voltage difference of the reference voltage and the photodiode voltage (less any FPN noise) is now present for output.

Step 4 encompasses the column block selection process for reading all pixel data from the column readout blocks 120 and sending it to the output OUT of the chip output circuitry 110. The data readout process is accomplished using a bank of one-hot encoded flip-flops 100 which control column switches $COL_1$–$COL_n$. For $Row_1$ pixel readout, the respective column switches ($COL_1$–$COL_n$) for each column close only once.

In Step $4a_{col1}$, column switch $COL_1$ of the first column readout circuitry $Column_1$ is closed to read $Pixel_{1,1}$ (all other column switches $COL_2$–$COL_n$ remain open). In Step $4b_{col1}$, after $Pixel_{1,1}$ is read, column switches $COL_1$ is opened ($COL_2$–$COL_n$ are still open), and switch CHIP is closed to reset the gate voltage of transistor P2 in output block 110. Continuing on, in Step $4a_{COL2}$, switch CHIP is opened, and switch $COL_2$ of column readout circuit $Column_2$ is closed to read $Pixel_{1,2}$.

The readout process in Step 4 continues until the last pixel of the first row, $Pixel_{1,n}$ of $Row_1$, has been read. The bank of one-hot-coded flip-flops 100 connect to the second row of pixels $Row_2$ and repeat the process from Step 1 above. After the readout of the last row of pixels $Row_m$ is completed, switch $SEL_m$ is opened.

In a single clock cycle, the high pulse period can be used for closing switch COL, and the low pulse period can be used for opening switch CHIP. This means that during row pixel readout, the switch COL is always complemented with the switch CHIP. Therefore, in Step 4, the innovative circuit obtains a fast pixel readout rate of one pixel per clock cycle.

Table I summarizes the switch positions during the integration period and pixel readout.

TABLE I

Column Select and Pixel Readout

| | $RES_m$ | $SEL_m$ | CDS | $COL_1$ | $COL_2$ | $COL_3$ | CHIP |
|---|---|---|---|---|---|---|---|
| Integration period | 0 | 0 | X | X | X | X | X |
| Readout Step 1 | 0 | 0 | C | C | C | C | C |
| Readout Step 2 | 0 | C | C | 0 | 0 | 0 | C |
| Readout Step 3 | 0 | C | 0 | 0 | 0 | 0 | 0 |
| Readout Step $4a_{COL1}$ | C | C | 0 | C | 0 | 0 | 0 |
| Readout Step $4b_{COL1}$ | C | C | 0 | 0 | 0 | 0 | C |
| Readout Step $4a_{COL2}$ | C | C | 0 | 0 | C | 0 | 0 |
| Readout Step $4b_{COL2}$ | C | C | 0 | 0 | 0 | 0 | C |
| Readout Step $4a_{COLn}$ | C | C | 0 | 0 | 0 | C | 0 |
| Readout Step $4b_{COLn}$ | C | C | 0 | 0 | 0 | 0 | C |
| Ready for next pixel readout | | | | | | | |

Figure 10:
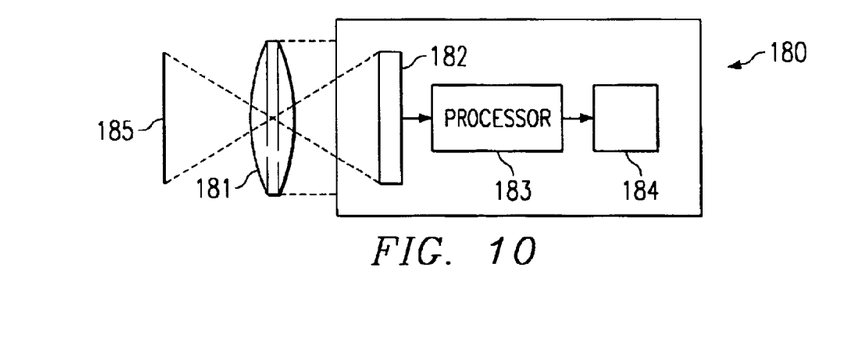
FIG. 10 shows a camera system incorporating the innovative fast readout architecture.

FIG. 10 shows a sequence of events which occur when the column circuits read the pixels. Assuming that initially, all pixels are in the integration phase, steps 1–3 are performed to prepare the column circuitry Column1 and output circuit for readout of the Column1 pixels. Next, all column circuits perform a parallel read of their respective first row pixel circuits and hold the data. The one-hot-coded flip-flops now signal successively, each column circuit such that the pixel data read from each column circuit is sent to the output circuitry in a serial fashion.

Imaging Sensor Chip

Figure 2:
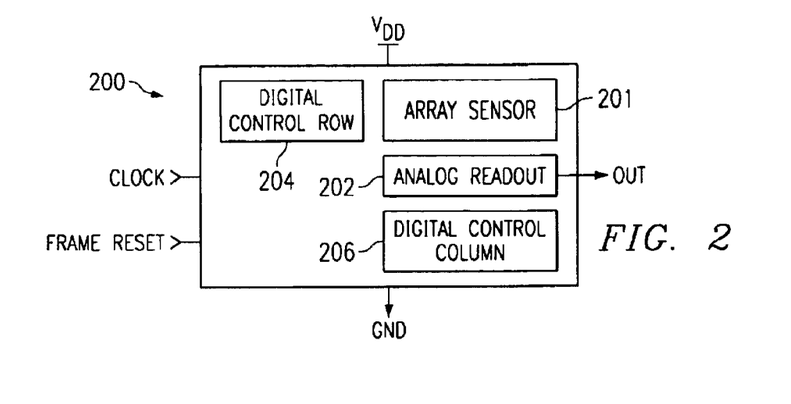
FIG. 2 shows a block diagram of a chip incorporating the innovative readout circuitry.

FIG. 2 shows a block diagram of a chip incorporating the innovative area array readout circuitry. The MOS imaging chip 200 comprises all necessary support functions on-board. The area array sensor circuitry 201 comprises m rows x n columns of pixel circuits. Row and column digital control circuits (204 and 206, respectively) provide the necessary control for selecting specific pixels for readout.

The readout signals are passed to the analog readout circuitry 202 for output of the pixel data at terminal OUT. CLOCK and FAME RESET signals are provided for proper synchronization of functions. Power VDD and ground GND are provided as noted.

A System Using the Imaging Sensor Chip

FIG. 11 shows a camera system incorporating the innovative fast readout architecture. A camera 180 has a lens 181 which focuses an image 185 onto the image sensor chip 182. A processor 183 receives the data from the image chip 183 and sends it to a storage system 184.

Sequential CDS Method

FIG. 3 is a simplified diagram of an SCDS architecture. The following discussion centers around a single pixel read operation, but it should be understood that a typical sensor comprises numerous pixel circuits in an array, as shown in FIG. 1. The principal blocks are the pixel block 300, the column block 340, and chip output block 380.

The primary components of the column block 340 (one for each column of pixels) are capacitors C1 and C2, PMOS transistor P1, switches CDS and COL, and current sources $I_{PIXEL}$ and $I_{COL}$. The chip output block 380 (one circuit for the whole chip) comprises, in this example, a PMOS transistor P2, a switch CHIP, and a current source $I_{CHIP}$. Typical approximate device parameters in a 0.6 micron process are the following: capacitors C1 and C2 range from 1–4 pF; current source values are 5–10 microamps for $I_{PIXEL}$, 20–100 microamps for $I_{CHIP}$, and 10–100 microamps for $I_{COL}$; sizes for transistors P1 and P2 50/0.6; transistor N1 approximates 2/0.6; and transistor RES approximates 1.25/0.6.

Opening switch SEL allows the column block circuitry 340 and chip output block circuitry 380 to be used for readout of signals from other pixels during the instant pixel's integration period.

At the start of the integration period, switch RES is closed and the voltage at node IN approximates the reset voltage $V_{RES}$. Next, opening switch RES begins the integration period, and allows current from the photodiode PD to remove charge from input node IN, thus decreasing the voltage at node IN from $V_{RES}$ to $V_{PD}$.

In Step 1, switches CDS, COL, and CHIP are closed. Closing switches CDS, COL, and CHIP initializes both the column block circuitry 340 and chip block circuitry 380 in preparation for the first readout of the charge at input node IN. The voltage across capacitor C1 approximates zero (current source $I_{PIXEL}$ removes any charge from capacitor C1) when switch CDS is open, and the voltage across C2 is $V_{gsP1}$ (the gate-to-source voltage of PMOS transistor P1). The voltage at the output OUT is low (at $V_{gsP2}$).

Step 2 begins by closing switch SEL and opening switch COL. Closing switch SEL couples the voltage developed at input node IN to the column block circuitry 340. With switch CDS still closed, capacitor C1 charges. The voltage across C1 becomes $V_{PD}-V_{gsN1}$ (where $V_{gsN1}$ is the gate-to-source voltage of NMOS transistor N1, and $V_{PD}$ is the voltage at node IN at the end of the integration period). The voltage across C2 remains at $V_{gsP1}$. The voltage at the output OUT remains at a low level ($V_{gsP2}$).

In Step 3, switches CDS and CHIP are then opened. Nodes B and E are now floating (or more precisely, not actively driven). The voltage across C1 remains $V_{PD}-V_{gsN1}$ and the voltage across C2 remains at $V_{gsP1}$. The voltage at the output OUT remains at a low level ($V_{gsp2}$). The column block circuit 340 is now ready to read the reference voltage $V_{RES}$. Note that both capacitors C1 and C2 are required for cancellation of the device threshold variations. Capacitor C1 cancels per-pixel $V_T$ variations, and capacitor C2 cancels variations in column amplifiers.

In Step 4, switches RES and COL are then closed. Closing switch RES while switch SEL is closed initiates sampling of the reference voltage $V_{RES}$ by the column block circuitry 340. The source voltage of transistor N1 becomes $V_{RES}-V_{gsN1}$. The voltage across C1 remains at $V_{PD}-V_{gsN1}$. Thus the gate voltage of transistor P1 rises to the difference of the reference voltage and the data signal voltage, and becomes $(V_{RES}-V_{gsN1})-(V_{PD}-V_{gsN1})=V_{RES}-V_{PD}$. The source voltage of transistor P1 becomes $(V_{RES}-V_{PD})-V_{gsP1}$ (since this is a P-channel device, voltage $V_{gsP1}$ is a negative value). The voltage across C2 remains $V_{gsP1}$. Thus the gate voltage of transistor P2 becomes $(V_{RES}-V_{PD})-V_{gsP1}+V_{gsP1}=V_{RES}-V_{PD}$, the voltage difference between the reference voltage and the data signal voltage. The readout voltage OUT is $V_{RES}-V_{PD}+V_{gsP2}$, where $V_{gsP2}$ is the gate-to-source voltage of PMOS transistor P2. Transistor P2 is a common device used for the readout of all pixels, but the chip output block circuitry 380 covers a wide variety of output circuits and may comprise a number of other techniques, e.g. differential amplifier circuits, linear circuitry, or any type of driver circuits for outputting the data from the chip.

Both $V_{gsN1}$ and $V_{gsP1}$ terms are canceled using the SCDS technique. Additionally, the $V_T$ term of both transistors N1 and P1, which are embedded in $V_{gsN1}$ and $V_{gsP1}$, are not present in the above equation. Thus the effect of CMOS threshold voltage mismatches are significantly suppressed with the disclosed innovative technique and FPN is reduced substantially.

Lastly, in Step 5, switch CHIP is closed and all other switches are opened. The voltage difference of $V_{RES}$ and $V_{PD}$ at the gate of transistor P2 is pulled to a low state leaving the readout voltage OUT equal to $V_{gsP2}$. Opening switches RES and SEL resets the pixel circuit for the next integration period. The system is ready for the next pixel readout. During the integration period of the present pixel (used in this example), the column 340 and chip output 380 blocks are being used for the readout of other pixels.

The following Table I summarizes all switch positions during the integration period and pixel readout.

| Switch | RES | SEL | CDS | COL | CHIP |
|---|---|---|---|---|---|
| Integration Period | 0 | 0 | X | X | X |
| Readout Step 1 | 0 | 0 | C | C | C |
| Readout Step 2 | 0 | C | C | 0 | C |
| Readout Step 3 | 0 | C | 0 | 0 | 0 |
| Readout Step 4 | C | C | 0 | C | 0 |
| Readout Step 5 | 0 | 0 | 0 | 0 | C |
| Ready for next Pixel readout | | | | | |

0 = open,
C = closed,
X = don't care

For the first order approximation, $V_{gsN1}$ and $V_{gsP1}$ depend primarily on the biased currents of $I_{PIXEL}$ and $I_{COL}$. However, $V_{gsN1}$ and $V_{gsP1}$ also are functions of drain voltages and backgate voltages. Although the SCDS technique cannot cancel all of the pattern noise, the technique provides an innovative way to significantly suppress it.

In a passive pixel arrangement, sensing transistor N1 is not present. Additionally, the capacitor C1 and current source $I_{PIXEL}$ are also not present. However, transistor RES is present.

The following Table II lists the simulated pixel readout, with and without the SCDS technique, for transistor N1 threshold voltage, $V_T$, variations in Texas Instrument's ("TI's") 33A21 process (0.6 micron, double-poly, triple-level metal).

| $V_\tau$ variation (mV) | +50 | +20 | +6 | 0 | −6 | −20 | −50 |
|---|---|---|---|---|---|---|---|
| Readout variation without SCDS (mV) | +42 | +16.7 | +5 | 0 | −5.1 | −16.8 | −41.8 |
| Readout variation with SCDS (mV) | +1.7 | +0.7 | +0.2 | 0 | −0.18 | −1 | −3 |

The following Table III presents simulated pixel readout voltages for both transistor N1 and transistor P1 threshold voltage $V_T$ variations in TI's 50BP21 process (0.72 micron, double-poly, triple-level metal).

| $V_\tau$ variation (mV) | +20 | +10 | +5 | 0 | −5 | −10 | −20 |
|---|---|---|---|---|---|---|---|
| Readout variation caused by N1 (mV) | +1.2 | +0.6 | +0.2 | 0 | −0.2 | −0.7 | −1.2 |
| Readout variation caused by P1 (mV) | +0.03 | +0.01 | +0.005 | 0 | −0.005 | −0.01 | −0.03 |

The simulation results clearly show that the SCDS technique suppresses FPN to about 1/25–1/20 of that without the SCDS technique. In these two processes, the $V_T$ variation in a wafer is approximately 5–6 mV. Therefore, the FPN could be as low as 0.2 mV, if the SCDS technique is applied.

Figure 4:
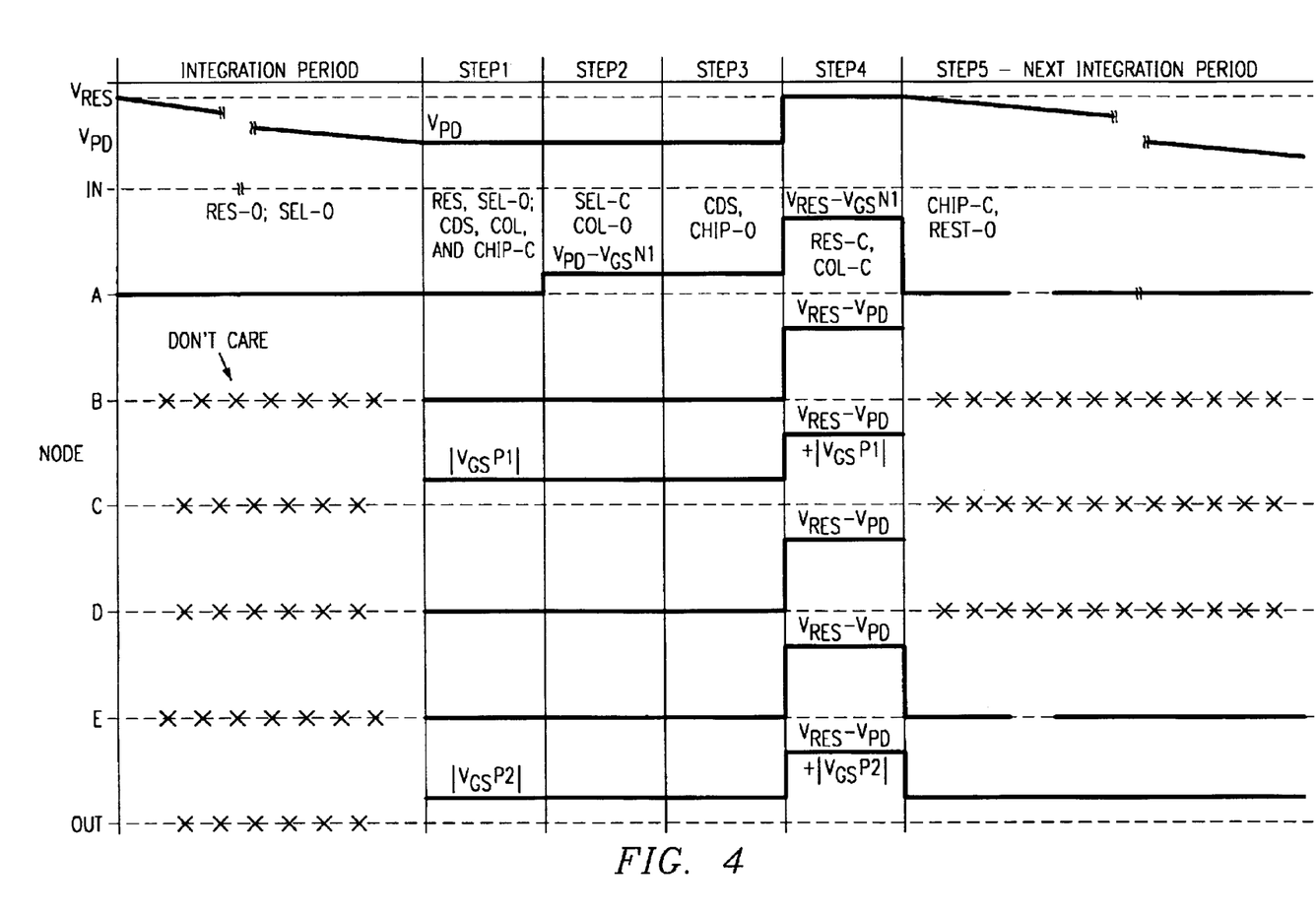
FIG. 4 shows a timing diagram of voltages at the various nodes designated in FIG. 3 during the integration and readouts phases.

FIG. 4 shows a timing diagram of voltages at the various nodes designated in FIG. 1 during the integration and readout phases.

Row and Column Select Circuitry

Figure 7:
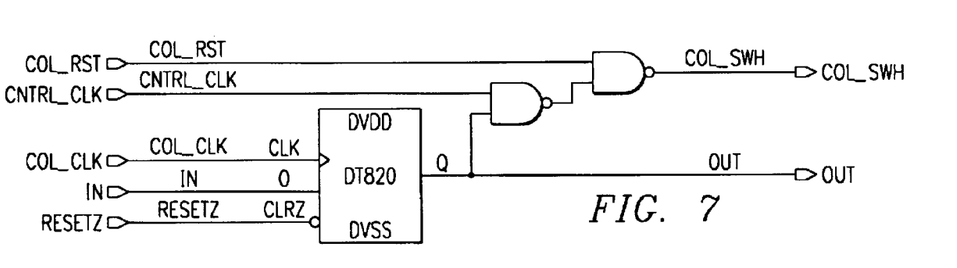
FIG. 7 shows a schematic of a single column circuit.

FIG. 7 shows a schematic of a single column select circuit. The basic cell comprises two NA240 NAND gates and a DTB20 edge-triggered D-type flip-flop. The col_rst command translates to the aforementioned COL switch which, when closed, initializes the column block circuit. The resetz signal line provides the reset capability for the DTB20 device, and is applied at the clrz input of the DTB20 device. The cntrl_clk input provides synchronized timing signals for the whole column circuit. The col_clk signal provides the edge-triggered timing for the DTB20 device, and consequently for the one-hot encoded architecture, and is applied to the clk, i.e., clock, input of the DTB20 device, while the in signal, applied to the "0," or data input, of the DTB20 device is the strobe signal for the respective column. The lines dvdd and dvss are the power supply and integrated circuit ground, respectively. The signal col_swh is the column switch signal for controlling a respective column switch $COL_1-COL_n$, while the signal out is simply the Q output of the DTB20 device, which may be used by other circuitry (not shown).

Figure 8:
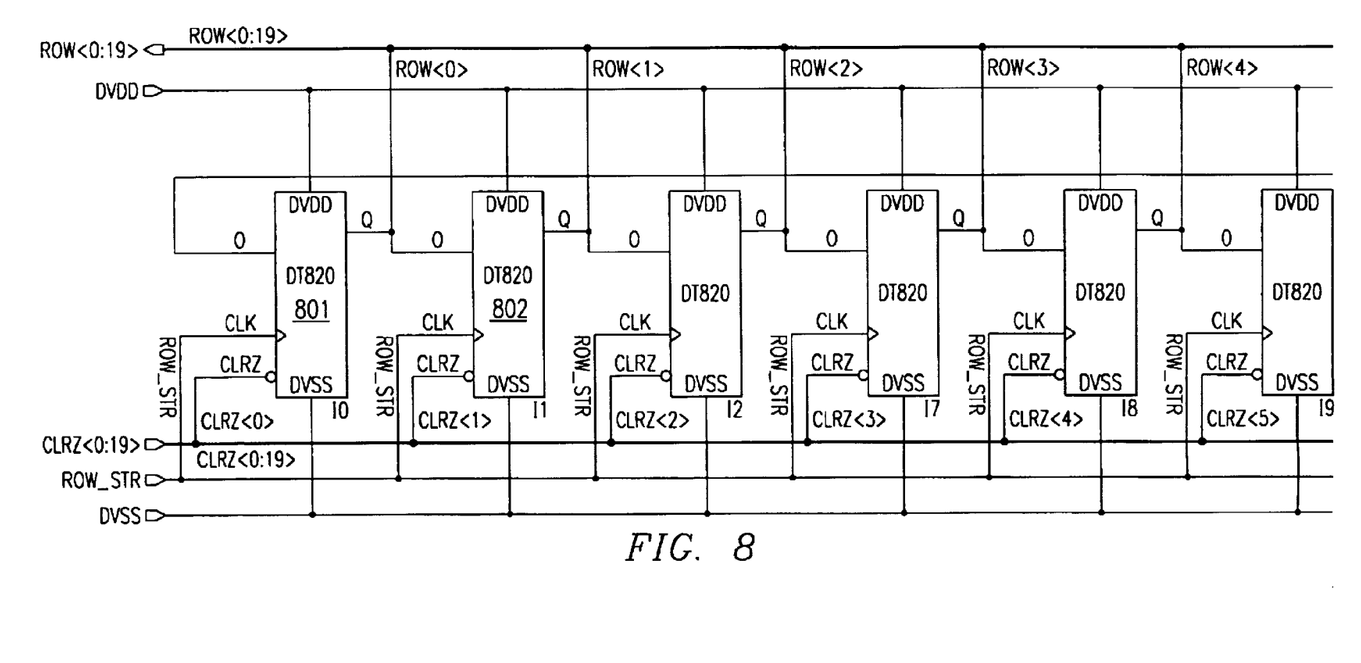
FIG. 8 shows a schematic closeup of 6 row select cells.

FIG. 8 shows a schematic of 6 row select cells from a bank of 20 row select circuits (0–19). For example, device 801 may be dedicated to handle the first row $Row_0$ of pixels, device 802 for the second row $Row_1$ of pixels, etc. The row_str signal is the same as the CDS signal, and strobes the edge-triggered clocking input to each of the DTB20 devices.

Similar to the column reset circuit, the clrz signal line provides the reset capability for the DTB20 device.

Figure 9:
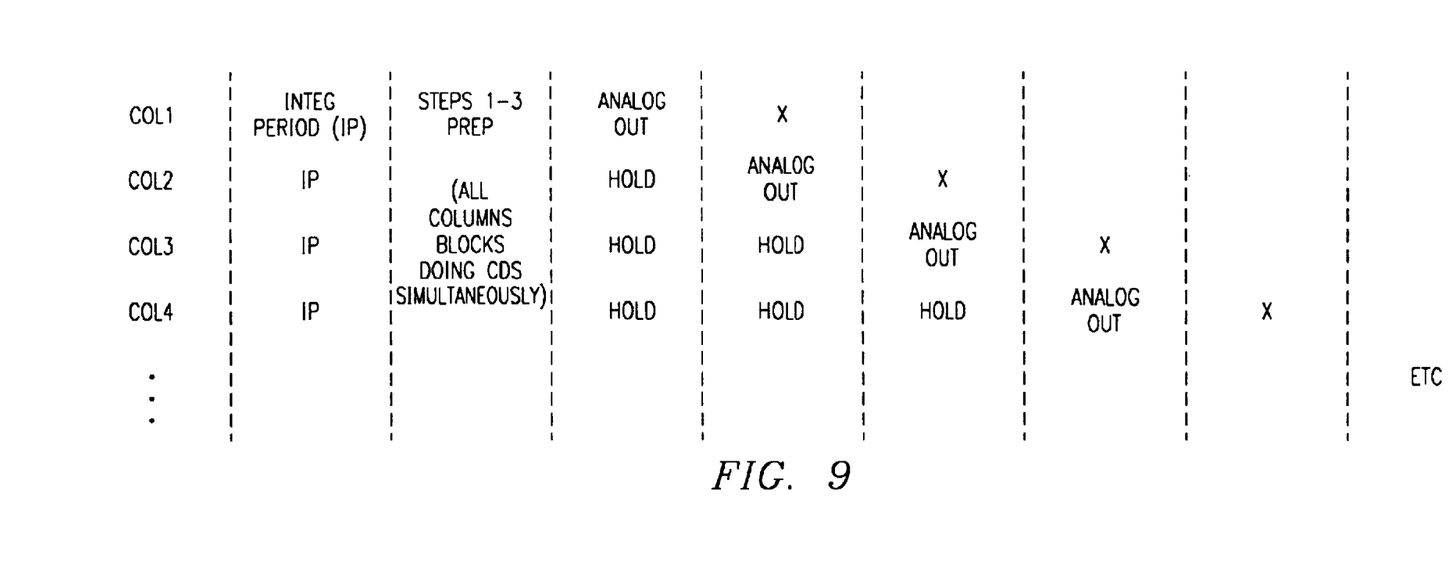
FIG. 9 shows a sequence of events which occur when the column circuits read the pixels.

FIG. 9 shows a schematic of the digital control section for both the rows and columns of a 20–20 area array sensor, as shown generally in FIG. 2. (It should be noted that the innovative techniques can also be applied to larger sensor arrays.) A central controller 900 provides primary control for row control circuit 901 and column control circuit 902. Row control circuit 901 provides the reset switch RES and select switch SEL commands to each of the pixel circuits. Column control circuit 902 provides control over all 20 columns, in this particular example. Primary controller 900 also provides switch CDS and switch CHIP closure control for the column block circuits and chip output block, respectively.

According to a disclosed class of innovative embodiments, there is provided: An integrated imaging chip, comprising: a plurality of pixels in an m row by n column array; a plurality of column readout circuits, each operatively connected to receive pixel signals from at least one respective column of said pixels; and an output circuit operatively connected to receive data signals from each of said column readout circuits; wherein said column readout circuits are collectively configured to all perform, in parallel, sequentially correlated double sampling operations on pixel readout data, and then in succession, to serially provide respective analog outputs to said output circuit.

According to another disclosed class of innovative embodiments, there is provided: An integrated MOS imaging chip, comprising: a plurality of pixels in an m row by n column array; a plurality of row select circuits operatively connected to each of said pixels; wherein said row select circuit provides at least a first row command to said pixels; wherein ones of said row select-circuit are operatively connected to ones of said pixels; a plurality of row reset circuits: wherein ones of said row reset circuit are operatively connected to ones of said pixels; a plurality of column readout circuits operatively connected to receive signals from said pixels; wherein each of said column readout circuits are operatively connected to receive signals from a column of pixels; a plurality of column control circuits; wherein ones of said column control circuit are operatively connected to ones of said column selection circuit; and an output circuit operatively connected to receive data signals from each of said column readout circuits; wherein successive pixels of a row are read out by successive clock signals in a one-to-one relationship.

According to another disclosed class of innovative embodiments, there is provided: An imaging system, comprising: a focusing element; an integrated MOS imaging chip for receiving images from said focusing element, and comprising: a plurality of pixels in an m row by n column array; a plurality of row select circuits operatively connected to each of said pixels; wherein said row select circuit provides at least a first row command to said pixels; wherein ones of said row select circuit are operatively connected to ones of said pixels; a plurality of row reset circuits: wherein ones of said row reset circuit are operatively connected to ones of said pixels; a plurality of column readout circuits operatively connected to receive signals from said pixels; wherein each of said column readout circuits are operatively connected to receive signals from a column of pixels; a plurality of column control circuits; wherein ones of said column control circuit are operatively connected to ones of said column selection circuit; and an output circuit operatively connected to receive data signals from each of said column readout circuits; wherein successive pixels of a row are read out by successive clock signals in a one-to-one relationship; a microprocessor for processing images from said imaging chip; and a storage medium for storing said processed images.

According to another disclosed class of innovative embodiments; there is provided: A method for reading pixels in an area array sensor, comprising the steps of: initializing column readout circuitry for receipt of pixel data signals, in an m row by n column area array; selecting said pixels individually by selectively engaging row and column select circuits; and reading a row of said pixels, said pixels read individually and successively in a one-to-one relationship with successive clock signals.

Modifications and Variations

As will be recognized by those skilled in the art, the innovative concepts described in the present application can be modified and varied over a tremendous range of applications, and accordingly the scope of patented subject matter is not limited by any of the specific exemplary teachings given, but is only defined by the issued claims.

Similarly, it will be readily recognized that the described process steps can also be embedded into hybrid process flows, such as BiCMOS or smart-power processes.

For another example, within the constraints well-known to those of ordinary skill, a sequential correlated doubling sampling method is not necessarily limited to serial reads, but may also use other methods.

For another example, within the constraints well-known to those of ordinary skill, a variety of well-known output driver configurations can be substituted for those shown.

For another example, within the constraints well-known to those of ordinary skill, two or even four column blocks may be implemented for the column readout circuitry.

For another example, within the constraints well-known to those of ordinary skill, in larger area array sensors, it may be advantageous to employ one output block circuit per column readout circuit to increase the readout speed.

For another example, within the constraints well-known to those of ordinary skill, in larger area array sensors, it may be advantageous to readout a complete row of pixels at one time (in a parallel fashion) by adding the necessary innovative circuitry to handle the parallel readout.

For another example, within the constraints well-known to those of ordinary skill, the one-hot-encoded circuitry may be replaced with other circuitry providing similar capability.

What is claimed is:

1. An integrated imaging chip, comprising:
   a plurality of pixel circuits in an m row by n column array, said pixel circuits each comprising
     a photosensitive element coupled between a first node and one side of a power source,
     a first switch coupled between said first node and another side of said power source, and
     a first MOS transistor coupled by a source and a drain between said other side of said power source and one port of a second switch, a gate of said MOS transistor being connected to said first node, another port of said second switch being coupled to an output of the pixel circuit;
   a plurality of column readout circuits, each operatively connected to receive at an input pixel signals from said outputs of said pixel circuits of at least one respective column of said pixel circuits, said column readout circuits each comprising
     a first current source coupled between said input of said column readout circuit and said one side of said power source, a second MOS transistor, a first capacitor coupled between said input of said column readout circuit and a gate of said second MOS transistor, a third switch coupled between said gate of said second MOS transistor and said one side of said power source, a second current source coupled between said other side of said power source and a second node, said second MOS transistor being coupled by a source and a drain between said second node and said one side of said power source, and a second capacitor having a port coupled between said second node and one port of a fourth switch, another port of said fourth switch being coupled to an output port of said column readout circuit; and an output circuit operatively connected to receive at an input data signals from said outputs of each of said column readout circuits, said output circuit comprising a third MOS transistor coupled by a source and a drain between said one side of said power source and an output node of said output circuit, and having a gate coupled to said input of said output circuit, a third current source couDled between said other side of said power source and said output node of said output circuit, and a fifth switch coupled between said gate of said third MOS transistor and said one side of said power source;

wherein said column readout circuits are thereby collectively configured to all perform, in parallel, sequentially correlated double sampling operations on pixel readout data, and then in succession, to serially provide respective analog outputs to said output circuit.

2. The integrated circuit of claim 1, wherein said array comprises row and column select circuits comprising one-hot encoded flip-flops.

3. The integrated circuit of claim 1, wherein a row reset circuit comprises one-hot encoded flip-flops.

4. The integrated circuit of claim 1, wherein after said pixel circuits are prepared for readout, successive pixels of a row are read out with clock signals in a one-to-one relationship.

5. An imaging system, comprising:

a focusing element;

an integrated MOS imaging chip for receiving images from said focusing element, and comprising:

a plurality of pixel circuits in an m row by n column array, said pixel circuits each comprising a photosensitive element coupled between a first node and one side of a power source, a first switch coupled between said first node and another side of said power source, and a first MOS transistor coupled by a source and a drain between said other side of said power source and one port of a second switch, a gate of said MOS transistor being connected to said first node, another sort of said second switch being coupled to an output of the pixel circuit;

a plurality of row select circuits operatively connected to each of said pixel circuits; wherein said row select circuit provides at least a first row command to said second switch of said pixel circuits; wherein ones of said row select circuit are operatively connected to ones of said pixel circuits;

a plurality of row reset circuits: wherein ones of said row reset circuit are operatively connected to ones of said pixel circuits to provide a reset command to operate said first switch;

a plurality of column readout circuits operatively connected to receive signals from said pixel circuits; wherein each of said column readout circuits are operatively connected to receive signals from a column of pixel circuits and to perform sequentially correlated double sampling operations on pixel readout data, said column readout circuits each comprising a first current source coupled between said input of said column readout circuit and said one side of said power source, a second MOS transistor, a first capacitor coupled between said input of said column readout circuit and a gate of said second MOS transistor, a third switch coupled between said sate of said second MOS transistor and said one side of said power source, a second current source coupled between said other side of said power source and a second node, said second MOS transistor being coupled by a source and a drain between said second node and said one side of said power source, and a second capacitor having a port coupled between said second node and one port of a fourth switch, another port of said fourth switch being coupled to an output port of said column readout circuit;

a plurality of column control circuits; wherein ones of said column control circuits are operatively connected to ones of said column readout circuits; and an output circuit operatively connected to receive data signals from each of said column readout circuits;

wherein successive pixels of a row are read out by successive clock signals in a one-to-one relationship;

a microprocessor for processing images from said imaging chip; and a storage medium for storing said processed images.

6. The system of claim 5, wherein said row and column select circuits comprise one-hot encoded flip-flops.

7. The system of claim 6, wherein said row reset circuit comprises one-hot encoded flip-flops.

* * * * *